US008922809B2

(12) United States Patent
Kang et al.

(10) Patent No.: US 8,922,809 B2
(45) Date of Patent: Dec. 30, 2014

(54) HOST APPARATUS CONNECTED TO IMAGE FORMING APPARATUS AND COMPATIBLE FUNCTION INFORMATION PROVIDING METHOD

(75) Inventors: Hyung-Jong Kang, Seoul (KR); In-Chang Park, Seoul (KR)

(73) Assignee: Samsung Electronics Co. Ltd., Suwon-Si (KR)

(*) Notice: Subject to any disclaimer, the term of this patent is extended or adjusted under 35 U.S.C. 154(b) by 887 days.

(21) Appl. No.: 12/662,161

(22) Filed: Apr. 1, 2010

(65) Prior Publication Data

US 2011/0051176 A1 Mar. 3, 2011

(30) Foreign Application Priority Data

Sep. 1, 2009 (KR) .................. 10-2009-0082145

(51) Int. Cl.
*G06F 3/12* (2006.01)
*G06F 15/16* (2006.01)
*G06F 15/177* (2006.01)
*G06K 9/00* (2006.01)
*G03G 15/00* (2006.01)

(52) U.S. Cl.
CPC .......... *G03G 15/5075* (2013.01); *G06F 3/1253* (2013.01); *G06F 3/1229* (2013.01); *G06F 3/1205* (2013.01); *G06F 3/1225* (2013.01); *G06F 3/1285* (2013.01); *G06F 3/1204* (2013.01)
USPC ........... 358/1.15; 709/203; 709/220; 382/100

(58) Field of Classification Search
CPC .. G03G 15/5075; G06F 3/1204; G06F 3/1205
USPC .................................. 709/203, 220; 382/100
See application file for complete search history.

(56) References Cited

U.S. PATENT DOCUMENTS

| | | | |
|---|---|---|---|
| 2004/0223182 A1 | 11/2004 | Minagawa | |
| 2006/0077428 A1* | 4/2006 | Lovat et al. | 358/1.15 |
| 2006/0139690 A1 | 6/2006 | Yagita | |
| 2008/0134179 A1 | 6/2008 | Takahashi | |
| 2010/0100586 A1* | 4/2010 | Bae | 709/203 |

FOREIGN PATENT DOCUMENTS

KR    10-2005-0065993    6/2005

OTHER PUBLICATIONS

Extended European Search Report mailed Dec. 10, 2012 in European Patent Application No. 10162048.2.
U.S. Final Office Action dated Mar. 18, 2013 from U.S. Appl. No. 12/817,311, pp. 1-22.
Office Action mailed Aug. 17, 2012, in U.S. Appl. No. 12/817,311.

(Continued)

*Primary Examiner* — Douglas Tran
*Assistant Examiner* — Justin Katzwhite
(74) *Attorney, Agent, or Firm* — Staas & Halsey LLP

(57) ABSTRACT

Disclosed are a host apparatus which is connected to an image forming apparatus and a compatible function information providing method thereof. The method includes: executing the integrated administration program of the host apparatus; receiving function information on at least one image forming apparatus; storing the received function information on the image forming apparatus; determining whether the function corresponding to the stored function information on the image forming apparatus is compatible with the integrated administration program or a sub application program within the integrated administration program; and separately displaying the integrated administration program or the sub application program corresponding to a determination result.

18 Claims, 9 Drawing Sheets

(56) References Cited

OTHER PUBLICATIONS

U.S. Appl. No. 12/817,311, filed Jun. 17, 2010, In-chang Park, Samsung Electronics Co., Ltd.

U.S. Office Action dated Sep. 29, 2014 from U.S. Appl. No. 12/817,311.

Office Action dated Jun. 16, 2014 from U.S. Appl. No. 12/817,311, 27 pages.

* cited by examiner

FIG. 3

```xml
<DeviceCapability>
  <ProductInfo>
    <ModelName>Samsung SCX-5x30 Series</ModelName>
    <MDL>SCX-5x30</MDL>
    <Company>Samsung</Company>
  </ProductInfo>
  <HardwareInfo>
    <Color>
        <Black/>
        <Cyan/>
        <Magenta/>
        <Yellow/>
    </Color>
    <Print type="Laser"/>
    <Scan />
    <Fax />
    <HardDisk />
    <IOChannel>
        <USB />
        <NETWORK />
    </IOChannel>
  </HardwareInfo>
</SoftwareInterfaceInfo>
```
41 — `<Scan2PC InterfaceVersion="1.0"/>`
`<Fax2PC InterfaceVersion="1.0"/>`
`<DPU InterfaceVersion="1.0"/>`
`<PCFAX InterfaceVersion="1.0"/>`
```xml
        <PCFax Notification />
    </PCFAX>
    <IDSALlert InterfaceVersion="1.0"/>
        <Network URL="/SmartPanel/sm.xml" />
        <USB />
    </IDSAlert>
    <ColorAccessControl InterfaceVersion="1.0">
        <PrinterLog URL="/ColorAccess/log.xml"/>
        <ColorAccessList URL="/ColorAccess/access.xml"/>
    </ColorAccessControl>
    <IDSJobAccounting InterfaceVersion="1.0/>
```

HOST APPARATUS CONNECTED TO IMAGE FORMING APPARATUS AND COMPATIBLE FUNCTION INFORMATION PROVIDING METHOD

CROSS-REFERENCE TO RELATED APPLICATION

This application claims priority from Korean Patent Application No. 10-2009-0082145, filed on Sep. 1, 2009, in the Korean Intellectual Property Office, the disclosure of which is incorporated herein by reference.

BACKGROUND

1. Field

Apparatuses and methods consistent with the embodiments relate to a host apparatus which is connected to an image forming apparatus and a compatible function information providing method thereof, and more particularly, to a host apparatus which is connected to an image forming apparatus to receive function information on at least one image forming apparatus for a user, and a compatible function information providing method thereof.

2. Description of the Related Art

An image forming apparatus forms an image on paper. The image forming apparatus may include, for example, a printer, a photocopier, a facsimile machine, or a multi-function device which has at least two functions.

Recently, demand for an image forming apparatus as an office automation device performing not only a print function but also a scanning function and faxing function has increased. Accordingly, the image forming apparatus has extended its original functions to perform various functions with high performance.

To more efficiently administrate the image forming apparatus connected in a network, a user (or an administrator) performs and manages various settings of each device, i.e., image forming apparatuses, by using a host apparatus such as a personal computer (PC). Thus, the host apparatus may provide a user with information on functions and setting values of the image forming apparatuses.

However, in providing information on the image forming apparatuses, the conventional host apparatus only demonstrates information on the functions and setting values of the image forming apparatuses, and does not provide information on whether a function is supported by a host apparatus or whether a program is installed to use the function.

Therefore, a user must perform an additional process to confirm whether a particular function is supported by the host apparatus. This is time-consuming and inconvenient.

SUMMARY

Accordingly, it is an aspect to provide a host apparatus connected to an image forming apparatus and compatible function information providing method thereof, which separately provides a user with information on functions of an image forming apparatus depending on whether a host apparatus supports the functions, to thereby improve a user's accessibility.

It is another aspect to provide a host apparatus connected to an image forming apparatus and a compatible function information providing method thereof, which provides a user with information on whether a particular function is installed, and provides a website or automatically connects to the website to download an installation program to thereby be convenient for a user.

Additional aspects and/or advantages will be set forth in part in the description which follows and, in part, will be apparent from the description, or may be learned by practice.

The foregoing and/or other aspects are achieved by providing a method of providing compatible function information of a host apparatus connected to at least one image forming apparatus, and the host apparatus being installed with an integrated administration program to control at least one function of the image forming apparatus, the method including: executing the integrated administration program of the host apparatus; receiving function information about the image forming apparatus; storing the received function information; if the function corresponds to the stored function information on the image forming apparatus, determining if the corresponding function is compatible with the integrated administration program or a sub application program within the integrated administration program; and separately displaying the integrated administration program or the sub application program corresponding to a result of the determining.

The separately displaying the integrated administration program and the sub application program may include enabling or disabling an icon of the sub application program corresponding to at least one function of the image forming apparatus.

The received function information in the storing the function information of the at least one image forming apparatus may be transmitted from the image forming apparatus selected from the integrated administration program or transmitted from at least one of the image forming apparatuses connectable to the host apparatus.

The method may further include displaying the received function information of the image forming apparatus, and the received function information includes at least one of a fax function, a scan function, a print function and a direct print utility (DPU), and at least one of a current status of the image forming apparatus, and supplies information.

The separately displaying the integrated administration program and the sub application program may include displaying an icon corresponding to a common function of the host apparatus regardless of a compatibility of the image forming apparatus.

The method may further include determining by the host apparatus whether a function corresponding to the displayed icon is installed; displaying whether the function is installed or a website to download an installation program corresponding to the function depending on a determination result; and downloading and installing the installation program corresponding to the displayed function.

The receiving the function information may include receiving the function information from an additional server.

The method may further include displaying a list of at least one image forming apparatus; selecting one of the image forming apparatuses from the displayed list, and the separately displaying the integrated administration program and the sub application program includes displaying status information on the selected image forming apparatus.

The foregoing and/or other aspects are achieved by providing a host apparatus which is connected to a plurality of image forming apparatuses, and is installed with an integrated administration program controlling at least one function of the image forming apparatuses, the host apparatus including: a user interface unit which executes the integrated administration program; a communication unit which receives function information on at least one of the image forming apparatuses; a storage unit which stores therein the received function information on the image forming apparatus; a display unit; and a controller which determines whether a function corresponding to the stored function information on the image forming apparatus is compatible with the integrated administration program or a sub application program within the integrated administration program, and controls the display unit to separately display the integrated administration program or the sub application program corresponding to a determination result of the controller.

The display unit may display an enabled or disabled icon of the sub application program corresponding to at least one function of the image forming apparatus.

The received function information may be transmitted from the image forming apparatus selected from the integrated administration program or from at least one image forming apparatus connectable to the host apparatus.

The display unit may further display the received function information on the image forming apparatus, and the function information includes at least one of a fax function, a scan function, a print function, a direct print utility (DPU) or combinations thereof. The display unit may further display at least one of a current status of the image forming apparatus, supply information.

The display unit may display an icon corresponding to a common function of the host apparatus regardless of a compatibility of the image forming apparatus.

The controller may determine whether the function corresponding to the displayed icon is installed, controls the display unit to display whether the function is installed or to display a website to download an installation program corresponding to the function depending on a determination result, controls the communication unit to download the installation program and installs the downloaded installation program.

The communication unit may receive the function information from an additional server.

The display unit may display a list of at least one image forming apparatus; the user interface unit selects one of the image forming apparatuses from the displayed list; and the display unit displays status information on the selected image forming apparatus.

BRIEF DESCRIPTION OF THE DRAWINGS

The above and/or other aspects will become apparent and more readily appreciated from the following description of the embodiments, taken in conjunction with the accompanying drawings of which:

FIG. 3 illustrates an example of function information of an image forming apparatus received by the host apparatus;

DETAILED DESCRIPTION

Figure 1:
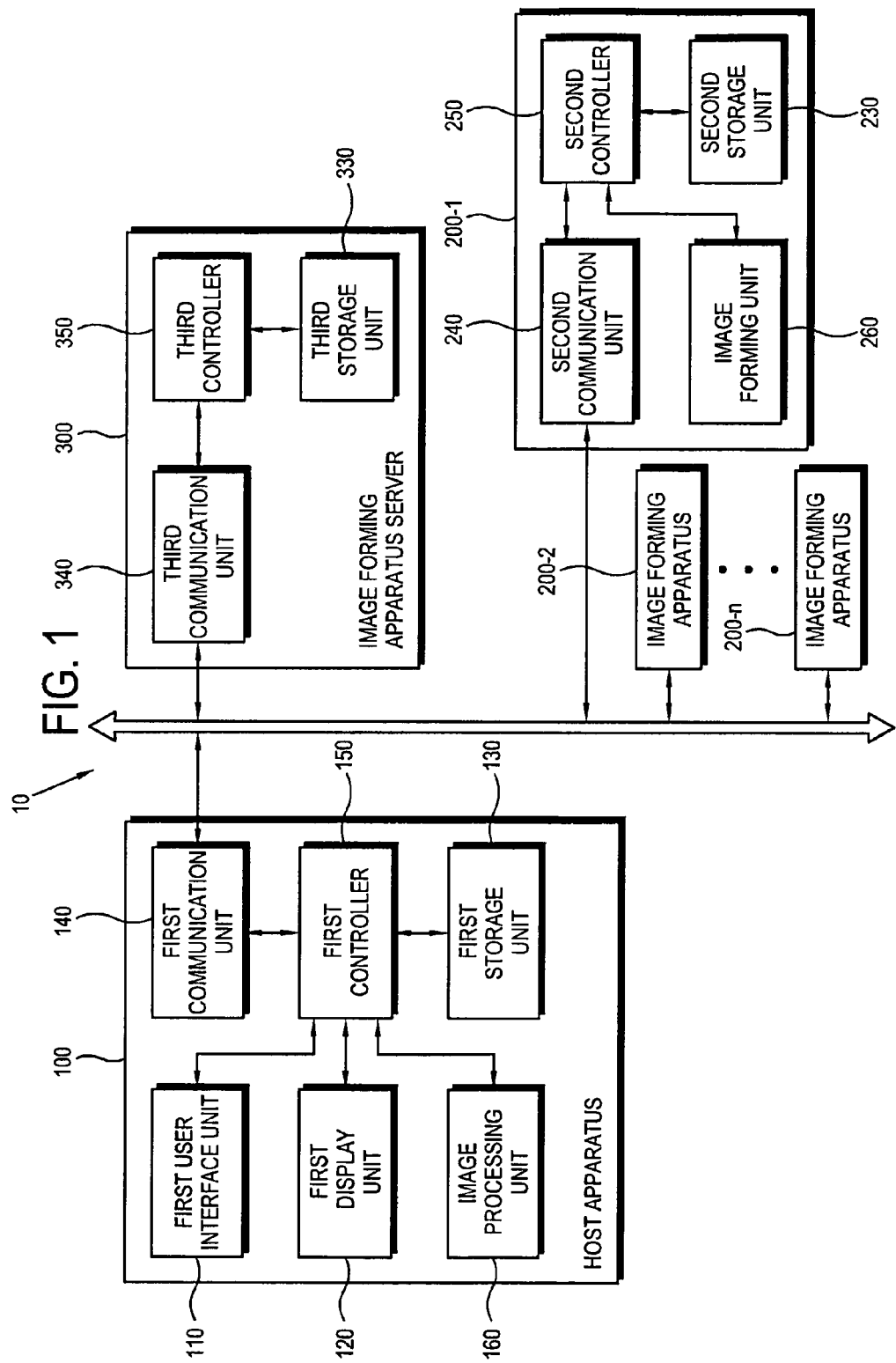
FIG. 1 is a block diagram of a host apparatus and an image forming system including the host apparatus according to an exemplary embodiment.

Reference will now be made in detail to the embodiments, examples of which are illustrated in the accompanying drawings, wherein like reference numerals refer to the like elements throughout.

Although plural image forming apparatuses 200 are shown, a single image forming apparatus 200 may also be used.

FIG. 1 is a block diagram of an image forming system 10 which includes a host apparatus 100.

As shown therein, the image forming system 10 may include the host apparatus 100, image forming apparatuses 200-1, 200-2, . . . and 200-n, and an image forming apparatus server 300. The image forming apparatus server 300 may be provided separately, or included in the host apparatus 100, or omitted.

If the image forming apparatus server 300 is omitted, the host apparatus 100 is connected to at least one of the image forming apparatuses 200-1, 200-2, . . . and 200-n, and receives various information including function information from the image forming apparatuses 200-1, 200-2, . . . and 200-n.

The host apparatus 100 may be a personal computer (PC). The image forming apparatuses 200-1, 200-2, . . . and 200-n may be a printer or a multi-function device performing at least two functions. The image forming apparatuses 200-1 and 200-2, . . . and 200-n may include an image forming unit 260 performing a print job according to a print command and connectable by a network, a local connection, a USB, parallel, UNC, etc.

Here, the print job includes a print job to copy a document after scanning, a print job for received fax data and a print job for print data received from the outside through the host apparatus 100 including a server or stored in an inside (HDD) or outside (USB memory stick) of the image forming apparatuses 200-1, 200-2, . . . and 200-n.

The image forming apparatuses 200-1, 200-2, . . . and 200-n may be connected locally to the host apparatus 100 or shared as a network image forming apparatus having their own IP addresses assigned in a network.

If the image forming apparatuses 200-1, 200-2, . . . and 200-n are locally connected to the host apparatus 100, the host apparatus 100 includes the image forming apparatus server 300.

If the image forming apparatuses 200-1, 200-2, . . . and 200-n are the network image forming apparatus, the image forming apparatus server 300 is separately provided to administrate at least one of the image forming apparatuses 200-1, 200-2, . . . and 200-n. The host apparatus 100 may receive various information on at least one of the image forming apparatuses 200-1, 200-2, . . . and 200-n from the image forming apparatus server 300.

A device administrating solution as an integrated administration program is installed in the host apparatus 100 to administrate at least one of the image forming apparatuses 200-1, 200-2, . . . and 200-n. Depending on the type of the image forming apparatuses 200-1, 200-2, . . . and 200-n, the solution may include an integrated printer driver (or a universal printer driver) to use the image forming apparatuses 200-1, 200-2, . . . and 200-n, or various applications to extend functions of the image forming apparatuses 200-1, 200-2, . . . and 200-n.

As shown in FIG. 1, the host apparatus 100 includes a first user interface unit 110, a first display unit 120, a first storage unit 130, a first communication unit 140, a first controller 150 and an image processing unit 160.

The first user interface unit 110 receives various commands and inputs from a user.

More specifically, the first user interface unit 100 may receive a user's input to execute an integrated desktop solution (IDS) as an integrated administration program to integrally administrate the device, i.e., the image forming apparatuses 200-1, 200-2, . . . and 200-n. The first user interface unit 100 may receive a user's command selecting one of the image forming apparatuses displayed on a list of the image forming apparatuses of an administration screen 20 (FIG. 2) displayed on the first display unit 120 (to be described later) or selecting one of functions of the selected image forming apparatus corresponding to an execution of the IDS.

A user may log onto at least one of the image forming apparatuses 200-1, 200-2, . . . and 200-n through the first user interface unit 110. A user may log on in an administrator mode which enables a user to set and change all the environments of the image forming apparatuses 200-1, 200-2, . . . and 200-n without an additional access limit from the host apparatus 100.

The first user interface unit 110 receives a user's input regarding an administrator ID and a password to log on in the administrator mode. The first controller 150 authenticates a user as a system administrator through the input administrator ID and password. A user according to the embodiments may include an administrator.

The first user interface unit 110 includes a keyboard, a mouse, etc. as an input device of the host apparatus 100. The first user interface unit 110 may include a graphic user interface (GUI) (hereinafter, also referred to as UI) generated by an execution of a driver or an additional application, and displayed on the first display unit 120 to input a command. The GUI may include an icon, a button, a text input window, etc. which a user may select.

If the first user interface unit 110 includes the GUI, the host apparatus 100 receives various commands or inputs corresponding to the administration screen 20 displayed on the first display unit 120 through an execution of the IDS.

The first display unit 120 displays the administration screen 20 for at least one connectable image forming apparatus 200-1, 200-2, . . . and 200-n.

Figure 2:
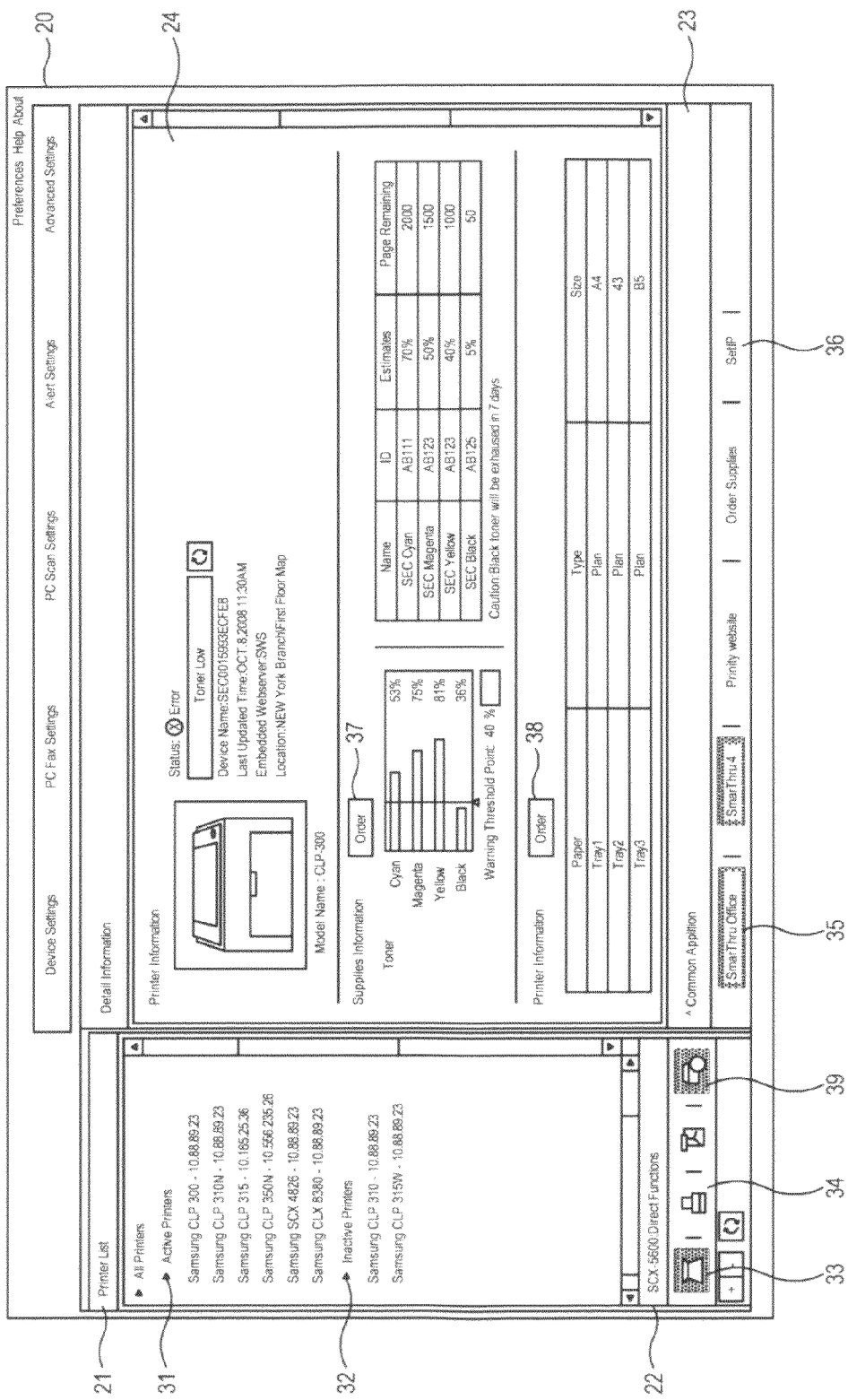
FIG. 2 illustrates an example of an administration screen according to the exemplary embodiment.

FIG. 2 illustrates an example of the administration screen.

If a user executes the IDS for a device, i.e., at least one image forming apparatus 200-1, 200-2, . . . and 200-n through the first user interface unit 110, the first display unit 120 may display the administration screen 20 for the device, as shown in FIG. 2.

The administration screen 20 includes a device list area 21 displaying a list of at least one of the image forming apparatuses 200-1, 200-2, . . . and 200-n, an inherent function area 22 displaying at least one function supported by the host apparatus 100 by using the IDS for a predetermined image forming apparatus, a common function area 23 supported by the host apparatus 100 by using the IDS regardless of a compatibility of the image forming apparatus, and a contents area 24 displaying status information on a predetermined image forming apparatus.

The device list area 21 displays a list of the image forming apparatuses 200-1, 200-2, . . . and 200-n connectable to the host apparatus 100. The first controller 150 discovers the image forming apparatuses 200-1, 200-2, . . . and 200-n connected in a network and lists in the device list area 21 by using a printer driver installed in the host apparatus 100 or the first communication unit 140.

Referring to FIG. 2, the first display unit 120 may separate the image forming apparatuses 200-1, 200-2, . . . and 200-n into an active printer 31 and an inactive printer 32 depending on a current status of the image forming apparatuses 200-1, 200-2, . . . and 200-n and provides lists in the device list area 21. That is, the first display unit 120 lists an image forming apparatus, which is installed in the host apparatus 100 but is not available currently, as the inactive printer 32.

A user may select one of the image forming apparatuses 200-1, 200-2, . . . and 200-n displayed on the device list area 21 through the first user interface unit 110.

The first display unit 120 provides information on the inherent function area 22 and the contents area 24 corresponding to the image forming apparatus selected from the device list area 21.

The inherent function area 22 displays a model name of the image forming apparatus selected from the device list area 21, and whether the function corresponding to the selected image forming apparatus is supported by the host apparatus 100.

More specifically, the inherent function area 22 displays an enabled or disabled icon corresponding to a plurality of functions of the host apparatus 100 depending on the compatibility with the selected image forming apparatus. Here, the icon may include text, a graph, etc.

Each function which is displayed in the inherent function area 22 includes a sub program within the IDS. That is, the inherent function area 22 may display the enabled or disabled icon of the sub application program corresponding to at least one function of the image forming apparatus selected from the device list area 21.

For example, if the selected image forming apparatus provides a scan function and a direct print utility (DPU) as a sub application program, icons corresponding to the scan function and the DPU, from among the icons displayed in the inherent function area 22, are enabled as in FIG. 2.

To support this function, the host apparatus 100 receives function information of at least one of the image forming apparatuses 200-1, 200-2, . . . and 200-n from the outside through the first communication unit 140. Here, the received function information of each of the image forming apparatuses 200-1, 200-2, . . . and 200-n may include a predetermined file having capability information on the image forming apparatuses 200-1, 200-2, . . . and 200-n.

FIG. 3 illustrates an example of the received function information of the image forming apparatus by the host apparatus 100.

As shown therein, a file which includes the received function information on the image forming apparatus, i.e., capability information, includes hardware information including a model name and color, and function information 41.

The first controller 150 determines through function information provided as software information whether a function is supported.

For example, a file which includes function information includes <Scan2PC Interface>, <Fax2PC Interface>, and <DPU Interface> as in FIG. 3, the first controller 150 determines that the image forming apparatus has a scan function, a fax function, and a DPU function, and controls the first display unit 120 to enable icons of sub programs corresponding to the scan function, the fax function and the DPU function from the inherent function area 22.

The first controller 150 further controls the first display unit 120 to disable a PDF print function, which is a sub program and is not included in the file of the function information.

The first controller 150 controls the first communication unit 140 to receive the function information as above from the outside. Here, the first communication unit 140 may receive the function information directly from at least one connectable image forming apparatuses 200-1, 200-2, . . . and 200-n or from the image forming apparatus server 300 storing various information on at least one of the image forming apparatuses 200-1, 200-2, . . . and 200-n.

The first communication unit 140 may receive the function information from the image forming apparatus selected from the device list area 21 or from all of image forming apparatuses connectable to the host apparatus 100.

The first communication unit 140 communicates with at least one of the image forming apparatuses 200-1, 200-2, ... and 200-n or the image forming apparatus server 300. The first communication unit 140 may include a wireless/wired communication module which is connected with an external device such as the image forming apparatuses 200-1, 200-2, ... and 200-n, or to the image forming apparatus server 300 locally or in a network by a predetermined protocol.

The first controller 150 may control the first communication unit 140 to receive the function information according to a user's command, or at regular intervals.

The received function information on at least one of the image forming apparatuses 200-1, 200-2, ... and 200-n is stored in the first storage unit 130.

The first storage unit 130 may include an internal or external storage module such as a hard disc drive (HDD), universal serial bus (USB) flash memory, etc. The first storage unit 130 of the host apparatus 100 may further store therein authentication information to authenticate a user, or an administration mode.

The first storage unit 130 further stores therein function information supported by the IDS installed currently in the host apparatus 100, i.e., sub application program information.

The function supported by the host apparatus 100 may include not only inherent function for each of the image forming apparatuses 200-1, 200-2, ... and 200-n but also a common function of the host apparatus 100, which is not related to a compatibility with the image forming apparatuses 200-1, 200-2, ... and 200-n.

The first controller 150 compares the function information received from the outside and corresponding to the predetermined image forming apparatus, and function information supported by the host apparatus 100 by using the IDS or the sub application program, and controls the first display unit 120 to separately display the enabled or disabled icons of the sub application program within the IDS of the host apparatus 100, depending on the compatibility with the image forming apparatus.

That is, the icon of the sub application program which is compatible with the image forming apparatus is enabled, and the icon of the sub application program which is not compatible with the image forming apparatus is disabled.

The icon which is enabled in the inherent function area 22 is a UI selectable by a user, and is included in the first user interface unit 110.

A user may select an enabled icon 33 (e.g., scan function icon) to perform a function corresponding to the icon selected from the inherent function area 22 with respect to the image forming apparatus selected from the device list area 21.

The disabled icon 34 (e.g., fax function icon) corresponds to a function which is not compatible with the image forming apparatus selected from the device list area 21, i.e., a function which is not supported by the IDS of the host apparatus 100. A user may not select the disabled icon.

The enabled or disabled icon of the inherent function area 22 is displayed depending on the compatibility between the image forming apparatus and the host apparatus 100, thereby improving a user's accessibility.

The first display unit 120 may additionally display an explanation on the function of the icon in the inherent function area 22. For example, if a user accesses the scan icon 33 by using the first user interface unit 110 such as a mouse, the display unit 120 may display an explanation such as "this scans a document and generates an image file".

If an execution program (or application or software) of a function is not installed in the host apparatus 100 even though the function corresponding to the icon of the inherent function area 22 is supported by the image forming apparatus and the host apparatus 100, the first controller 150 may automatically connect to a website to download the execution program according to a user's selection.

For example, if a user selects an icon 39 corresponding to the enabled DPU and an additional program is required to perform the DPU, the first controller 150 may control the first communication unit 140 to connect a website (e.g., http://solution.samsungprinter.com/personal/DPU) for a user to download the installation program.

A user may download the installation program from the connected website to store the installation program in the first storage unit 130, and normally use the DPU by executing the stored installation program.

The first controller 150 may control the first display unit 120 to generate and display a UI asking a question on whether to download the installation program, and determine whether to download the installation program according to a user's selection corresponding to the displayed UI.

The common function area 23 displays a common function supported by the host apparatus 100 through the IDS regardless of the inherent function of the image forming apparatus selected from the device list area 21. That is, the common function includes a function which is available in the host apparatus 100 through IDS regardless of the type of the image forming apparatus.

The common function area 23 may separately display icons corresponding to each function depending on whether the host apparatus 100 supports the function, i.e., depending on an installation of the function.

The first controller 150 determines whether to install a function corresponding to each icon by using registry information stored in the first storage unit 140.

Figure 4:
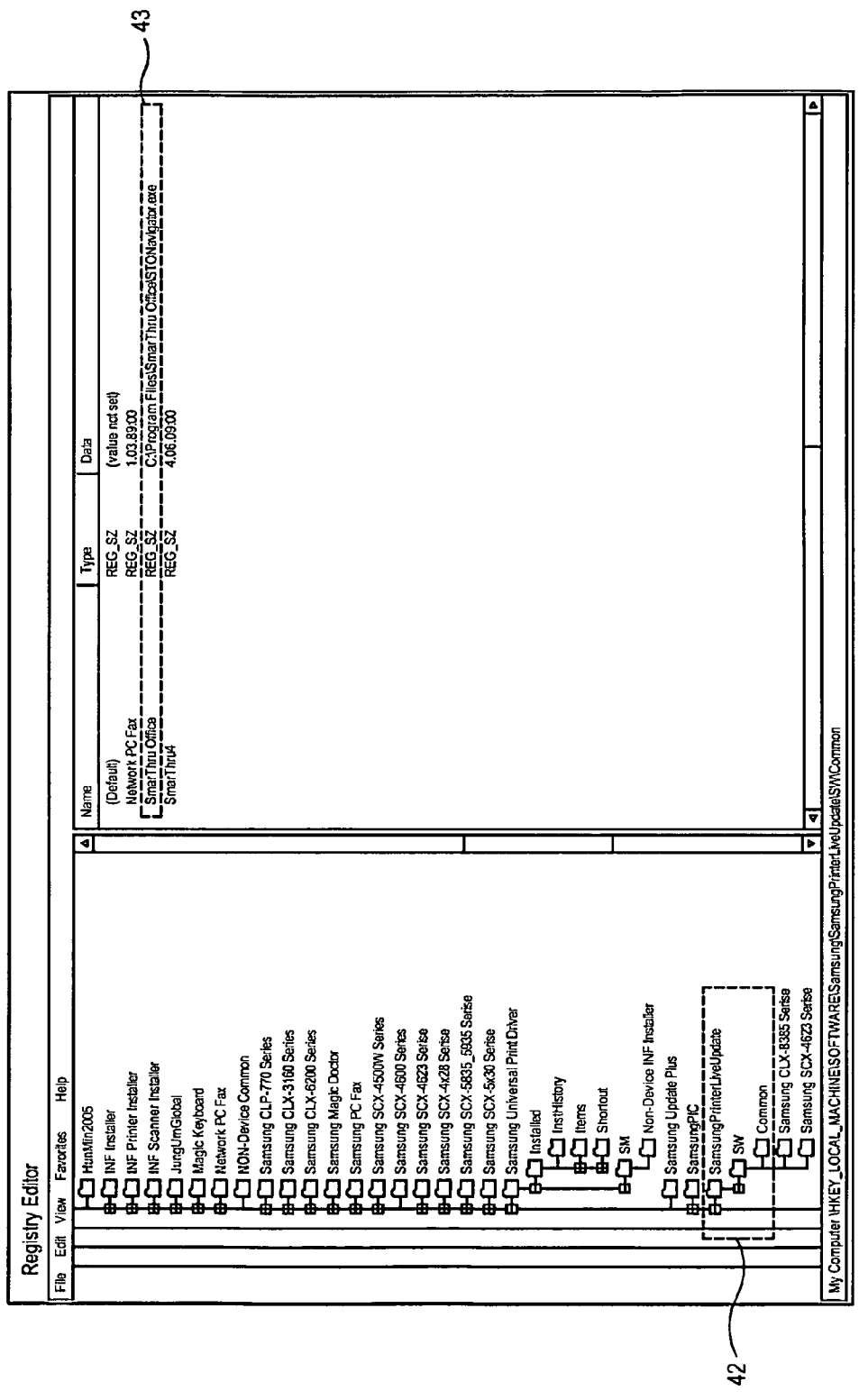
FIG. 4 illustrates an example of registry information stored in the host apparatus of FIG. 1.

FIG. 4 illustrates an example of registry information stored in the host apparatus 100.

As shown in FIG. 4, if execution path information 43 is displayed in a registry key corresponding to the common function 42 selected from a registry information displaying screen, the first controller 150 determines that the function is installed in the host apparatus 100.

The first display unit 120 may display a plurality of enabled icons 35 or disabled icons 36 of the common function area 23 depending on whether the function is installed in the host apparatus 100 as in FIG. 2, i.e., depending on whether the host apparatus 100 supports the function. More specifically, the icon of the common function installed in the host apparatus 100 is displayed as an enabled icon 35 and the icon of the common function which is not installed in the host apparatus 100 is displayed as a disabled, such as setup IP icon 36.

FIGS. 5 to 8 illustrate an installation of a program by using an administration screen in the host apparatus 100.

Figure 5:
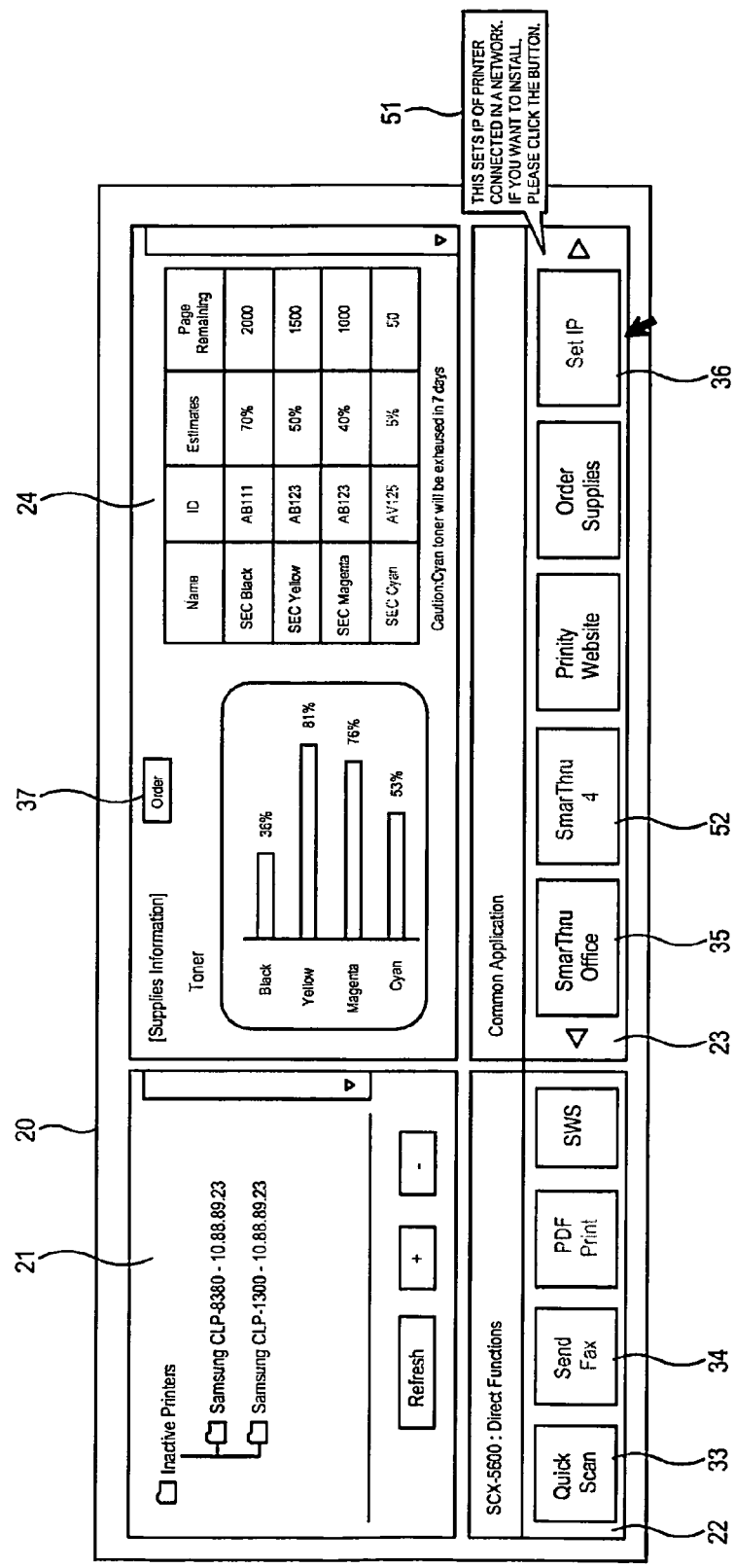
FIGS. 5 to 8 illustrate an installation of a program by using the administration screen of the host apparatus of FIG. 1.

As shown in FIG. 5, the first display unit 120 may display an enabled or disabled icon of the common function area 23 depending on whether the function is installed in the host apparatus 100. The first display unit 120 may additionally display an explanation message 51 of the function together with the icon. For example, if a user accesses a Setup IP icon 36 through the user interface unit 110 such as a mouse, the first display unit 120 may display an explanation message 51 such as "this sets up IP of printer connected in the network".

If it is required to install an additional program (or application or software) in the host apparatus 100 to use the icon, the first controller 150 may control the first display unit 120 to display a website to download the installation program or control the first communication unit 140 to automatically connect to the website.

If the automatic connection to the website is set, the first display unit 130 may further display a message such as "if you want to install, please click the button" as in FIG. 5.

If a user selects a Smart Thru 4 function icon 52 and an additional program is required to perform the selected function, the first controller 150 may control the first communication unit 140 to connect to the website (e.g., http://solution.samsunqprintercom/personal/SmarThru4) to download the installation program.

A user may download the installation program from the connected website to store the installation program in the first storage unit 130, and normally use the function by executing the stored installation program.

The first controller 150 may control the first display unit 120 to generate and display a UI asking a question on whether to download the installation program, and determine whether to download the installation program according to a user's selection corresponding to the displayed UI.

The first controller 150 may separately display the functions corresponding to the icons displayed in the common function area 23 as a basic function and an extended function.

Figure 6:
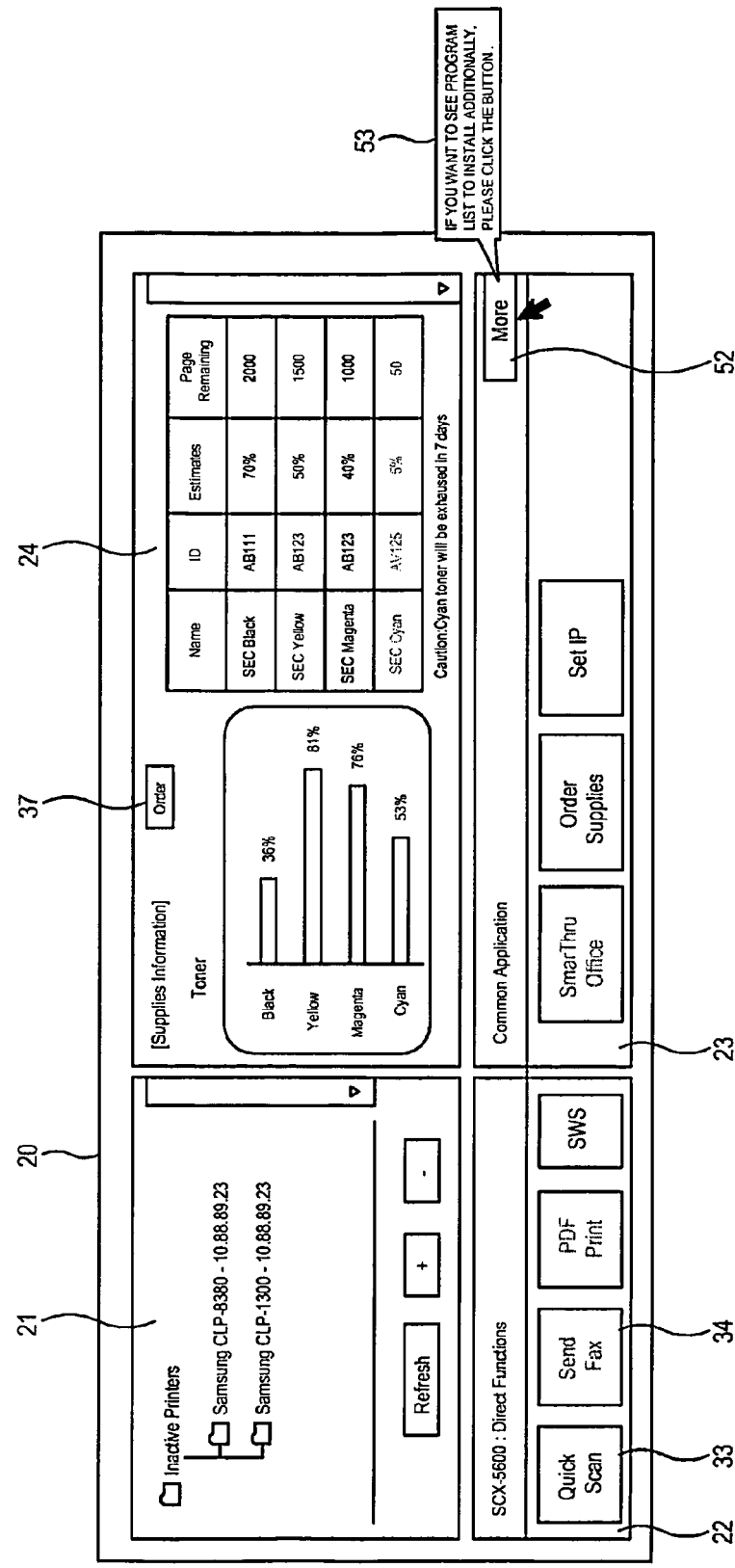

More specifically, referring to FIG. 6, the first controller 150 may control the first display unit 120 to display only icons of basic functions from among the common functions in the common function area 23.

If a user desires to check more available functions, he/she may use a more button 52 provided in the common function area 23.

If a user accesses the more button 52 by using the user interface unit 110 such as a mouse, the first display unit 120 may display a message 53 such as "Click the button if you want to see a list of programs which can be installed additionally."

Figure 7:
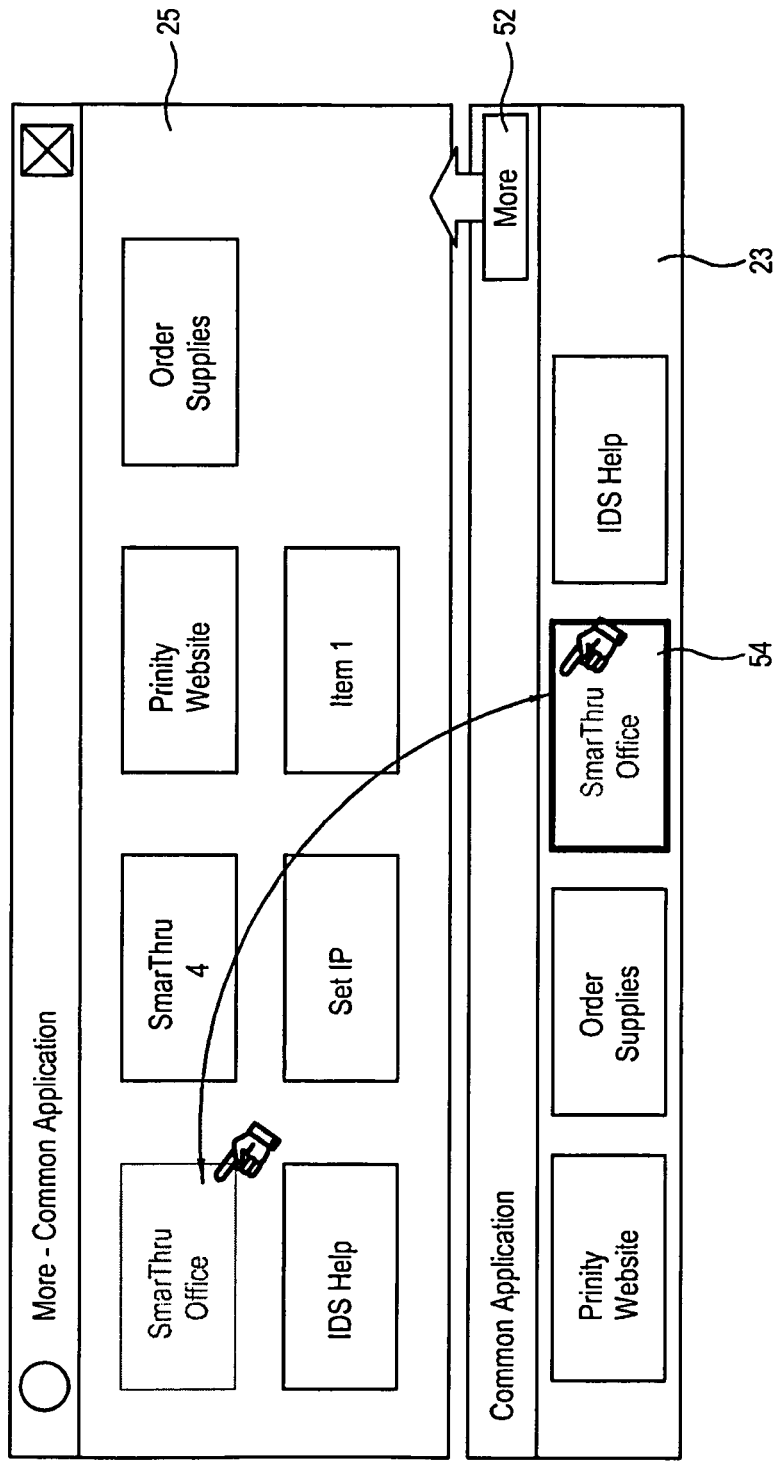

If a user selects the more button 52 in FIG. 6, an extended function area 25 is further displayed as shown in FIG. 7. If a user selects the more button 52 again, the extended function area 25 becomes hidden, as in FIG. 6.

If a user accesses each icon of the common function area 23 and the extended function area 25 through the user interface unit 110, an explanation of the function corresponding to the icon may be displayed as a type of message tip.

A user may freely move icons between the common function area 23 and the extended function area 25 through the user interface unit 110, to use a drag and drop function of a mouse, for example.

Figure 8:
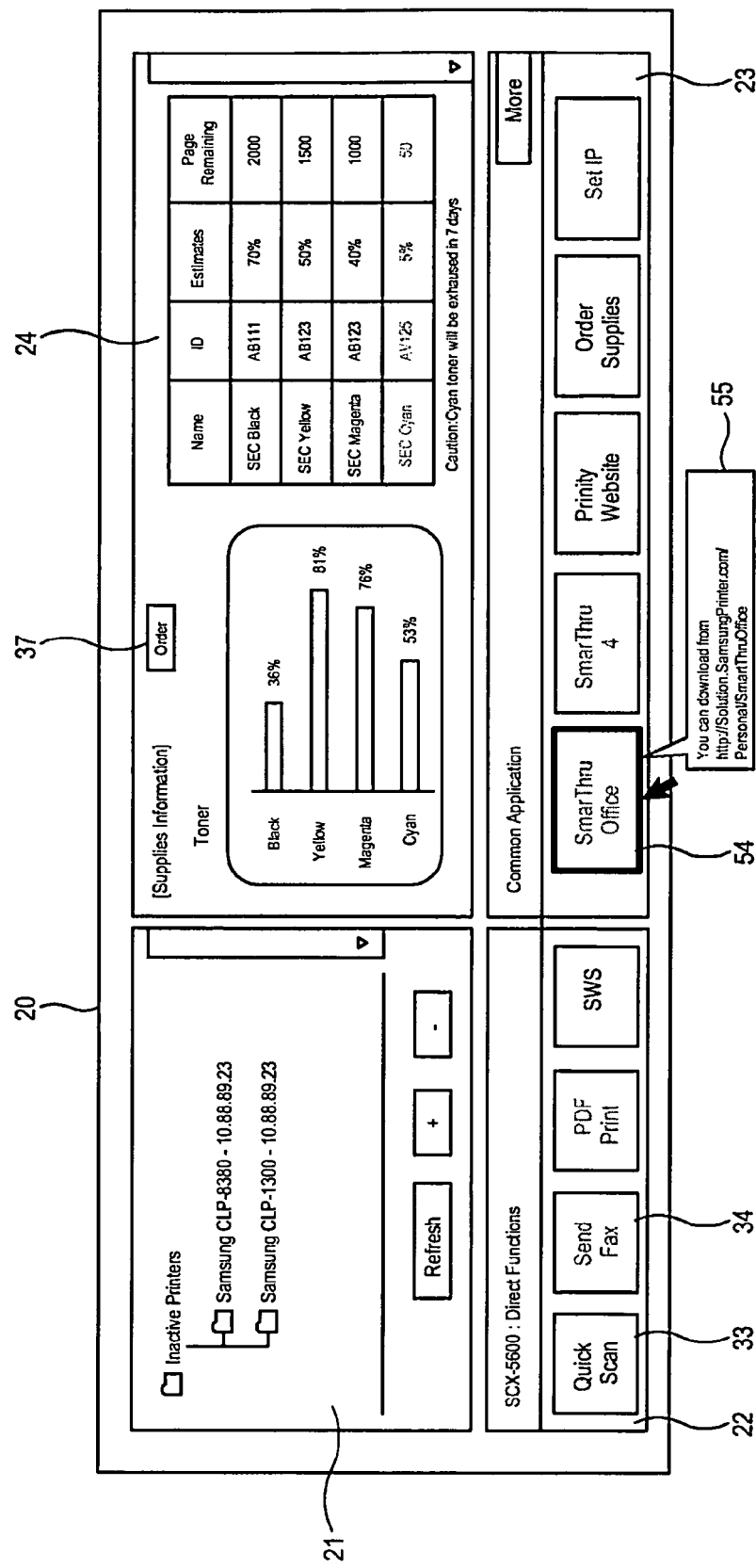

If a user moves the icon of the common function to the common function area 23, moves the icon corresponding to an unnecessary common function to the extended function area 25, and selects the more button 52 again, the extended function area 25 is hidden from the display unit 120, as in FIG. 8.

As shown in FIG. 8, the first display unit 120 may display each icon of the common function area 23 selected by a user as an active printer or an inactive printer depending on whether the function is installed in the host apparatus 100. If a user accesses an installed icon, such as smart thru office function icon 54, through the user interface unit 110, the first display unit 120 may display a website to download the installation program together with a message 55 "you can download from http://solution.samsungprinter.com/personal/SmarThruOffice".

As the case may be, the first controller 150 may control the first communication unit 140 to automatically connect to the website if a user selects the icon 54.

If a user selects the Smart Thru Office function icon 54, and an additional program is required to perform the selected function, the first controller 150 may control the first communication unit 140 to connect to a website (e.g., http://solution.samsunoprintercom/personal/SmarThruOffice) to download the installation program.

A user may download the installation program from the connected website to store the installation program in the first storage unit 130, and execute the stored installation program and install the program to normally use the function.

The downloaded installation program may be executed automatically or according to a user's selection.

The first controller 150 may control the first display unit 120 to generate and display a UI asking a question as to whether to download the installation program, and determine whether to download the installation program according to a user's selection corresponding to the displayed UI.

The first controller 150 controls the first display unit 120 to display the download result and the installation result of the installation program.

The contents area 24 displays status information on the image forming apparatus selected from the device list area 21.

More specifically, referring to FIG. 2, the contents area 24 may display a current status of the selected image forming apparatus, information on supplies such as toner and paper, i.e., status information.

The first controller 150 controls the first communication unit 140 to receive the status information on at least one of the image forming apparatuses 200-1, 200-2, ... and 200-*n* from the outside, and stores the received status information in the first storage unit 130. The first controller 150 controls the first display unit 120 to display the stored status information in the contents area 24.

The first communication unit 140 may receive the status information directly from at least one of the image forming apparatuses 200-1, 200-2, ... and 200-*n* or from the image forming apparatus server 300 storing therein the status information of each image forming apparatus.

The reception of the status information may be performed by a user's selection or at regular intervals.

A user may confirm the status information of the contents area 24. If a user determines that a toner in a particular color or paper is exhausted, he/she may order the necessary supplies online by selecting order buttons 37 and 38. Then, the first controller 150 controls the first communication unit 140 to send an email ordering the supplies corresponding to a user's order.

The first controller 150 controls the host apparatus 100 as a whole.

More specifically, if the IDS is executed, the first controller 150 controls the first communication unit 140 to receive a predetermined file including function information of at least one of the image forming apparatuses 200-1, 200-2, ... and 200-*n*, i.e., capability information from the outside, and stores the received function information in the first storage unit 130.

The first controller 150 determines whether the stored function of the image forming apparatuses 200-1, 200-2, ... and 200-*n* is compatible with the IDS installed in the host apparatus 100 or the sub application program within the IDS, and controls the first display unit 120 to separately display the IDS or the sub application program according to a determination result.

The first controller 150 may display an enabled or disabled icon of a sub application program corresponding to at least one function in the inherent function area 22.

The first controller 150 may control the first display unit 120 to display the icon corresponding to the common function of the host apparatus 100 in the common function area 23 regardless of a compatibility with the image forming apparatuses 200-1, 200-2, ... and 200-*n*.

The first controller 150 may control the first display unit 120 to separately display a basic function and an extended function in the common function area 23 and the extended function area 25, respectively, as in FIGS. 6 to 8.

With respect to the administration screen 20 shown in FIGS. 2, 5 to 8, the first controller 150 may control the first display unit 120 to additionally display an explanation of the function corresponding to each icon displayed in the inherent function area 22, the common function area 23 and the extended function area 25.

If a program should be additionally installed for the function, the first controller 150 may control the first display unit 120 to display the website where a user may download the program, or control the first communication unit 140 to automatically connect to the website.

The image processing unit 160 generates print data in a predetermined print language according to a print command through the first user interface unit 110. The generated print data is transmitted to at least one of the image forming apparatuses 200-1, 200-2, ... and 200-*n* through the first communication unit 140.

The image forming apparatuses 200-1, 200-2, ... and 200-*n* receive the print data from the host apparatus 100 and perform a print job.

Returning to FIG. 1, the image forming apparatuses 200-1, 200-2, ... and 200-*n* include a second storage unit 230 which stores therein print data, use quantity information and inherent information on the image forming apparatus, a second communication unit 240 which communicates with the host apparatus 100, a second controller 250 which controls the image forming apparatus as a whole, and the image forming unit 260 which performs a print job based on the received print data.

The second controller 250 controls the second communication unit 240 to transmit function information and status information on the image forming apparatuses 200-1, 200-2, ... and 200-*n* to the host apparatus 100 or the image forming apparatus server 300.

If the image forming apparatus server 300 is separately provided, as shown in FIG. 1, it receives various information including function information and status information from at least one of the image forming apparatuses 200-1, 200-2, ... and 200-*n* through a third communication unit 340.

A third controller 350 stores in a third storage unit 330 the function information and the status information received from at least one of the image forming apparatuses 200-1, 200-2, ... and 200-*n*.

The host apparatus 100 may receive the function information of the image forming apparatus selected from the device list area 21 in FIG. 2 by connecting to the image forming apparatus server 300 through the first communication unit 140.

The host apparatus 100 may transmit an installation history of a program, which has been installed through the IDS, to the image forming apparatus server 300 through the first communication unit 140. The image forming apparatus server 300 may store the received installation history in the third storage unit 330.

The host apparatus 100 receives the function information of at least one of the image forming apparatuses 200-1, 200-2, ... and 200-*n* to separately display a plurality of functions of the host apparatus 100 depending on a compatibility with the image forming apparatus based on the received function information, to thereby improve a user's accessibility, displays a website or automatically connects to the website to download a necessary program to thereby provide a user with convenience in the installation process.

Figure 9:
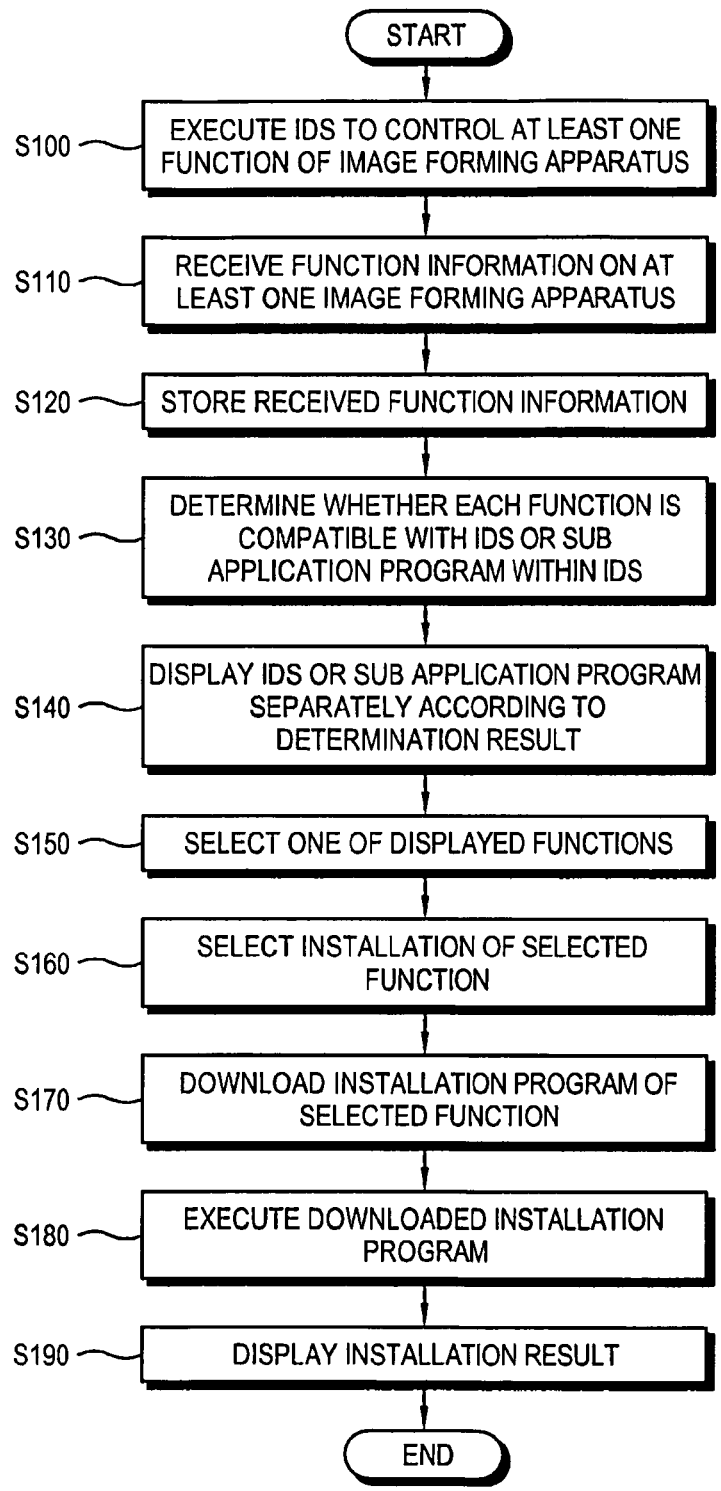
FIG. 9 is a flowchart which describes a method of providing function information of the host apparatus of FIG. 1.

Hereinafter, a process of providing function information of the host apparatus 100 in the image forming system 10 with the foregoing configuration will be described with reference to FIG. 9.

As shown therein, a user may execute the IDS installed in the host apparatus 100 (S100). The IDS as an integrated administration program may include an integrated desktop solution which controls at least one function of the image forming apparatuses 200-1, 200-2, ... and 200-*n*.

The host apparatus 100 may receive the function information on at least one of the image forming apparatuses 200-1, 200-2, ... and 200-*n* corresponding to the execution of the IDS at operation S100 (S110). The host apparatus 100 may receive the function information from at least one of the image forming apparatuses 200-1, 200-2, ... and 200-*n* or from the image forming apparatus server 300. The received function information may include a file including capability information, as in FIG. 3.

The function information received at operation S110 may be transmitted from the selected image forming apparatus by executing the IDS or from at least one of the image forming apparatuses 200-1, 200-2, ... and 200-*n* connectable to the host apparatus 100.

The first controller 150 stores the function information received at operation S110 in the first storage unit 130 (S120). The first controller 150 may display the received function information in the first display unit 120. The function information may include at least one of a fax function, a scan function, a print function, and a DPU. The function information may further include at least one of the current status of the image forming apparatuses 200-1, 200-2, ... and 200-*n* and supply information.

The IDS which is installed in the host apparatus 100 may display a list of at least one of connectable image forming apparatuses 200-1, 200-2, ... and 200-*n* and display the status information on the image forming apparatus selected by a user from the list.

The first controller 150 determines whether the function corresponding to the function information received at operation S110 is compatible with the IDS or the sub application program within the IDS (S130). That is, the first controller 150 determines through the function information stored at operation S120 whether a function supported by the host apparatus 100 through the IDS or the sub application program within the IDS is compatible with the functions of the image forming apparatuses 200-1, 200-2, ... and 200-*n*.

The first controller 150 separately displays the IDS or the sub application program within the IDS according to a determination result at operation S130 (S140). According to the determination result at operation S130, the first display unit 120 may display the enabled or disabled icon of the sub application program corresponding to at least one function of the host apparatus 100 as in FIG. 2 depending on the compatibility with the image forming apparatuses 200-1, 200-2, ... and 200-*n*.

The first controller 150 may display an icon corresponding to the common function of the host apparatus 100 regardless of the compatibility with the image forming apparatus at operation S140.

The first controller 150 may display the enabled or disabled icon depending on whether the function corresponding to the displayed icon is installed in the host apparatus 100.

A user may select one of the functions displayed at operation S140 (S150). The first display unit 120 may additionally display an explanation or installation of the selected function, and display a website to download an installation program if the program of the selected icon is required.

If the program of the icon selected at operation S150 is required, a user may select to install the selected function through the user interface unit 110 (S160). The first display unit 120 may ask a user whether to install the function, and determine the installation according to a user's response.

According to the selection result at operation S160, the first controller 150 controls the first communication unit 140 to download the installation program (S170) of the function selected at operation S150. The downloaded installation program is stored in the first storage unit 130.

The first controller 150 executes the installation program downloaded at operation S170 automatically or according to a user's selection, and installs the program (S180).

The process of downloading and installing the program at operations S160 to S180 may be manually performed by a user's selection or may automatically be performed regardless of a user's selection.

The first display unit 120 may display the installation result at operation S180 for a user.

According to the embodiment, the host apparatus 100 separately provides a user with each function according to whether the function is supported, to thereby improve a user's accessibility, and provides a website or automatically connects to the website to download the installation program to provide thereby a user with convenience in the installation process.

As described above, a host apparatus connected to an image forming apparatus and a compatible function information providing method thereof separately provides functions of the image forming apparatus depending on whether the functions are supported, to thereby improve a use's accessibility.

Further, the host apparatus connected to the image forming apparatus and the compatible function information providing method thereof informs whether a particular function is installed, and provides a website or automatically connects to the website to download an installation program if the program is not installed.

Although a few exemplary embodiments have been shown and described, it will be appreciated by those skilled in the art that changes may be made in these exemplary embodiments without departing from the principles and spirit of the embodiments, the scope of which is defined in the appended claims and their equivalents.

What is claimed is:

1. A method of providing compatible function information of a host apparatus connected to at least one image forming apparatus, the host apparatus being installed with an integrated administration program to control at least one function of the image forming apparatus, the method comprising:
    executing the integrated administration program of the host apparatus;
    receiving function information about one of the image forming apparatus;
    storing the received function information;
    if the function of the image forming apparatus corresponds to the stored function information on the image forming apparatus, determining if the corresponding function is compatible with the integrated administration program or a sub application program within the integrated administration program; and
    separately displaying, on a display of the host apparatus, the integrated administration program or the sub application program corresponding to a result of the determining,
    wherein the separately displaying the integrated administration program and the sub application program comprises enabling or disabling an icon of the sub application program, displayed on the host apparatus, which corresponds to the at least one function of the image forming apparatus.

2. The method according to claim 1, wherein the host apparatus is connected to a plurality of the image forming apparatuses, the method further comprising transmitting the stored received function information from one of the image forming apparatuses selected by the integrated administration program or transmitted from one image forming apparatuses connected to the host apparatus.

3. The method according to claim 1, further comprising displaying the received function information about the image forming apparatus, wherein the received function information comprises at least one of a fax function, a scan function, a print function a direct print utility (DPU), a current status of the image forming apparatus, supply information or combinations thereof.

4. The method according to claim 1, wherein the separately displaying the integrated administration program and the sub application program comprises displaying an icon corresponding to a common function of the host apparatus regardless of a compatibility of the image forming apparatus.

5. The method according to claim 4, further comprising:
    determining by the host apparatus whether a function corresponding to the displayed icon is installed;
    displaying whether the function is installed or a website to download an installation program corresponding to the function depending on a determination result; and
    downloading and installing the installation program corresponding to the displayed icon.

6. The method according to claim 1, wherein the receiving the function information comprises receiving the function information from an additional server.

7. The method according to claim 1, wherein the host apparatus is connected to a plurality of the image forming apparatuses, the method further comprising:
    displaying a list of the image forming apparatuses;
    selecting one of the image forming apparatuses from the displayed list, and the separately displaying the integrated administration program and the sub application program comprises displaying status information on the selected image forming apparatus.

8. A host apparatus which is connected to a plurality of image forming apparatuses, and is installed with an integrated administration program controlling at least one function of the image forming apparatuses, the host apparatus comprising:
    a user interface unit which executes the integrated administration program;
    a communication unit which receives function information on at least one of the image forming apparatuses;
    a storage unit which stores therein the received function information on the image forming apparatus;
    a display unit; and
    a controller which determines whether a function corresponding to the stored function information on the image forming apparatus is compatible with the integrated administration program or a sub application program within the integrated administration program, and controls the display unit to separately display the integrated administration program or the sub application program corresponding to a determination result of the controller, wherein the display unit displays an enabled or disabled icon of the sub application program corresponding to the at least one function of the image forming apparatus.

9. The host apparatus according to claim 8, wherein the received function information is transmitted from the image forming apparatus selected from the integrated administration program or from one of the image forming apparatuses connected to the host apparatus.

10. The host apparatus according to claim 8, wherein the display unit further displays the received function information on the image forming apparatus, and the function information comprises at least one of a fax function, a scan function, a print function, a direct print utility (DPU), a current status of the image forming apparatus, supply information or combinations thereof.

11. The host apparatus according to claim 8, wherein the display unit displays an icon corresponding to a common function of the host apparatus if determined the image forming apparatus is not compatible with the integrated administration program of the sub application program.

12. The host apparatus according to claim 11, wherein the controller determines whether the function corresponding to the displayed icon is installed, controls the display unit to display whether the function is installed or to display a website to download an installation program corresponding to the function depending on a determination result of the controller, controls the communication unit to download the installation program and installs the downloaded installation program.

13. The host apparatus according to claim 8, wherein the communication unit receives the function information from an additional server.

14. The host apparatus according to claim 8, wherein the display unit displays a list of at least one of the image forming apparatuses;

the user interface unit selects one of the image forming apparatuses from the displayed list; and the display unit displays status information on the selected image forming apparatus.

15. A method of providing compatible function information of a host apparatus connected to at least one image forming apparatus, the method comprising:

executing an integrated desktop solution (IDS) installed in the host apparatus;

receiving function information about at least one image forming apparatus;

storing the received function information;

determining a compatibility of a function supported by the at least one image forming apparatus with a function supported by the host apparatus through the IDS or a sub application program within the IDS, using the stored received function information, displaying a representation corresponding to the function on a display screen of the host apparatus in a first predetermined manner when the function is determined to be compatible, and in a second predetermined manner when the function is determined to be incompatible, wherein the displaying the representation corresponding to the function in a first predetermined manner comprises displaying an enabled icon selectable by a user to perform the function corresponding to the icon, and the displaying the representation corresponding to the function in a second predetermined manner comprises displaying a disabled icon not selectable by a user.

16. The method according to claim 15, wherein the receiving function information comprises receiving a predetermined file having capability information of the one image forming apparatus which includes the function information of the one image forming apparatus.

17. The method according to claim 15, wherein the function information includes at least one of a fax function, a scan function, a print function, and a direct print utility.

18. The host apparatus according to claim 8, wherein the display unit displays a list of the plurality of image forming apparatuses in a device list area, and in response to a selection of one of the image forming apparatuses among the image forming apparatuses displayed in the device list area, the display unit displays an enabled icon of the sub application program corresponding to a first function which is compatible with the selected image forming apparatus, and displays a disabled icon of the sub application program corresponding to a second function which is not compatible with the selected image forming apparatus.

\* \* \* \* \*